(12) United States Patent
McGowan et al.

(10) Patent No.: US 7,690,711 B2
(45) Date of Patent: Apr. 6, 2010

(54) ENDGATE ASSEMBLY WITH DAMPER RELEASABLE FROM KEYED STUD

(75) Inventors: Michael P. McGowan, Sterling Heights, MI (US); Edward L. Schulte, White Lake, MI (US); Derek L. Patterson, Shelby Township, MI (US); Balakrishna Chinta, Troy, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 0 days.

(21) Appl. No.: 12/203,225

(22) Filed: Sep. 3, 2008

(65) Prior Publication Data

US 2010/0052355 A1 Mar. 4, 2010

(51) Int. Cl.
*B62D 33/03* (2006.01)
*B62D 33/033* (2006.01)
(52) U.S. Cl. .......................... 296/57.1; 296/52; 296/59
(58) Field of Classification Search .................. 296/50, 296/52, 53, 57.1, 59, 146.8
See application file for complete search history.

(56) References Cited

U.S. PATENT DOCUMENTS

| 346,534 | A | * | 8/1886 | Damon | 296/59 |
| 733,165 | A | * | 7/1903 | Davis et al. | 296/52 |
| 4,981,320 | A | * | 1/1991 | Bowman | 296/57.1 |
| 7,213,857 | B2 | * | 5/2007 | Austin | 296/50 |
| 2003/0116991 | A1 | * | 6/2003 | Katulka | 296/57.1 |
| 2004/0026950 | A1 | * | 2/2004 | Zagaroff | 296/57.1 |
| 2004/0113448 | A1 | * | 6/2004 | Kharod | 296/50 |
| 2005/0212320 | A1 | * | 9/2005 | Ousley et al. | 296/57.1 |
| 2007/0096492 | A1 | * | 5/2007 | Austin | 296/50 |
| 2008/0100084 | A1 | * | 5/2008 | Ohly | 296/50 |
| 2008/0224494 | A1 | * | 9/2008 | Anderson et al. | 296/57.1 |
| 2008/0252093 | A1 | * | 10/2008 | Armstrong et al. | 296/57.1 |
| 2008/0277960 | A1 | * | 11/2008 | Zagoroff | 296/57.1 |

* cited by examiner

*Primary Examiner*—Jason S Morrow
(74) *Attorney, Agent, or Firm*—Quinn Law Group, PLLC

(57) ABSTRACT

An endgate assembly connectable to a vehicle body for opening and closing a vehicle bed formed by the body includes an endgate supportable by the vehicle body at a pivot connection and openable and closable by pivoting about the pivot connection. A keyed support member is securable to the vehicle body. A damper and a cable are connected to the endgate. Both the damper and the cable have ends that are configured to be retained by the keyed support member when the endgate is pivoted between the open and closed position. The cable and damper ends can be removed from the keyed support member without tools when the cable end is rotated relative to the keyed support member. A method of modifying the vehicle bed by detaching or reattaching the endgate assembly is also provided.

11 Claims, 3 Drawing Sheets

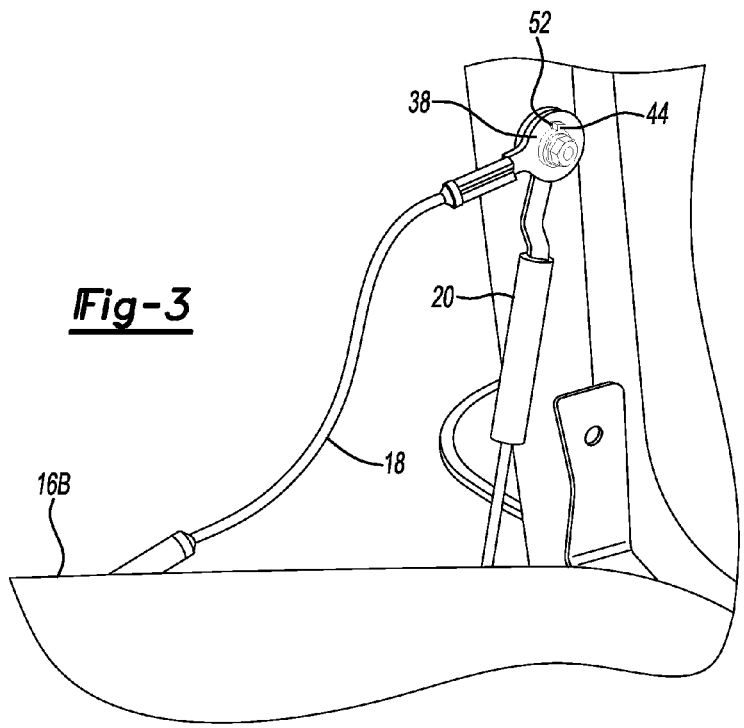
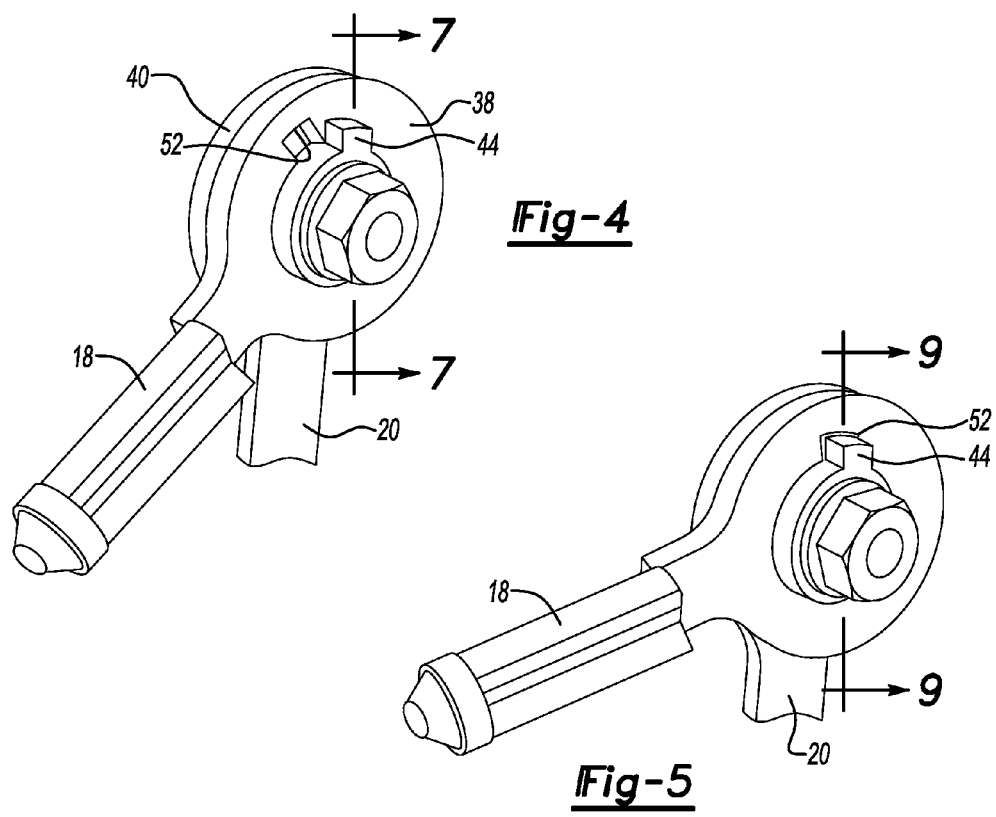

ENDGATE ASSEMBLY WITH DAMPER RELEASABLE FROM KEYED STUD

TECHNICAL FIELD

The invention relates to a vehicle endgate with a damper and a method of removing the same from a vehicle.

BACKGROUND OF THE INVENTION

Many pickups are equipped with pivotable endgates that close off the end of the pickup bed and are removable from the vehicle body simply by lifting one side of the endgate from a pivot connection and sliding the endgate transversely with respect to the vehicle to release the other side of the endgate from the pivot connection.

Removal of the endgate may be desired in order to access the bed without leaning over the endgate, to attach loading ramps directly to the floor of the bed, or for other purposes for which flexibility of the bed and access to the bed is beneficial. Reattaching the endgate then requires only lowering the endgate to the pivot connection and sliding it transversely into place.

On some pickups, cables are provided to support the endgate when it is in an open position. The cables may have spring clips on the end that clip to a hook on the vehicle sidewall. Thus, the cables are unclipped from the hooks to release the cables from the sidewall, prior to lifting the endgate to remove the endgate from the vehicle. When the endgate is reattached, the cables are clipped to the hooks again.

Other pickups include both cables and dampers supporting the endgate and having ends adapted to fit over a sleeve on the sidewall and retained to the sleeve via a nut and bolt. Heretofore, such damped endgate assemblies have not provided the quick and easy detachment and reattachment that some pickup owners have come to expect. For example, known damped endgate assemblies cannot be removed from the vehicle without using tools to remove the nut and bolt so that the cable and damper ends can be released from the sleeve, and, similarly, cannot be reattached to the vehicle without tightening the nut and bolt with these same tools. The loose nut and bolt may be easily lost in the interim.

SUMMARY OF THE INVENTION

Modern pickups may be equipped with a damper on either side of the endgate to provide a damped lowering of the endgate upon opening. Accordingly, a low cost, easy to use removable and reattachable endgate with dampers is provided that integrates the connection and removal of the cables with the connection and removal of the dampers, requires no tools for removal and reattachment, and involves no loose components. Those skilled in the art may alternatively refer to a damper as a dampener; accordingly, as used herein, a damper may alternatively be referred to as a dampener.

Accordingly, an endgate assembly connectable to a vehicle body for opening and closing a vehicle bed formed by the body includes an endgate supported by the vehicle body at a pivot connection and openable and closable by pivoting about the pivot connection. A keyed support member is securable to the vehicle body. A damper and a cable are connected to the endgate. The damper may be pneumatic, or may be any other type of suitable damping mechanism. Both the damper and the cable have ends that are configured to be retained by the keyed support member when the endgate is pivoted between the open and closed position. The cable and damper ends can be removed from the keyed support member without tools when the cable end is rotated relative to the keyed support member. The endgate must be held between the open and closed position while turning the cable end in order to allow sufficient slack in the cable.

More specifically, in one embodiment, the keyed support member has a shank with a protruding key feature. The damper end has a keyhole feature and is configured to slide over the shank when the keyhole feature is aligned with the protruding key feature to secure the damper to the keyed support member. The cable end has a keyhole feature that is configured to slide over the shank when the keyhole feature is aligned with the key feature when the cable and damper are removed or secured to the keyed support member, and to move out of alignment with the keyhole feature when the cable is pulled taught, or when the cable end is manually rotated out of alignment, with the cable end between the damper end and the key feature, to thereby lock the cable and damper to the support member. Rotating the cable end to align the keyhole feature with the key feature allows the cable end to slide off of the shank, thereby allowing the damper end, which had been retained to the shank with the cable end preventing removal from the shank, to also be slid off the shank.

A method of modifying a vehicle bed on a vehicle wherein the endgate is connected to the vehicle via a cable and a damper as described above includes holding the endgate between an open position and a closed position. While holding the endgate, the cable end is turned until the keyhole feature in the cable end aligns with the key feature in a support member supporting the cable. After turning the cable end and while still holding the endgate, the cable end is slid off of the support member to release the cable end from the sidewall. After sliding the cable end, the damper end is then slid off of the support member to release the damper from the support member. The same process is repeated on a like cable and damper on the other side of the endgate to complete removal of the endgate from the vehicle.

The endgate with cable and damper can then be reattached by reversing the above steps. That is, the endgate is reattached to the vehicle by placing the endgate at the pivot connection, sliding the damper end onto the support member past the key feature, pivoting the endgate to a position between the open and the closed positions, turning the cable end on the support member to align the cable keyhole feature with the key feature, and sliding the cable end onto the support member past the key feature, thereby securing the cable and the damper to the vehicle.

The above features and advantages and other features and advantages of the present invention are readily apparent from the following detailed description of the best modes for carrying out the invention when taken in connection with the accompanying drawings.

BRIEF DESCRIPTION OF THE DRAWINGS

FIG. 3 is a schematic perspective illustration of the endgate assembly of FIGS. 1 and 2 with the endgate slightly lifted and the cable end turned to align a keyhole feature in the cable end with a key feature of the support member;

FIG. 4 is a schematic perspective fragmentary illustration of the cable end locked to the keyed support member;

FIG. 5 is a schematic perspective fragmentary illustration of the cable end turned to allow release from the support member;

DESCRIPTION OF THE PREFERRED EMBODIMENTS

Figure 1:
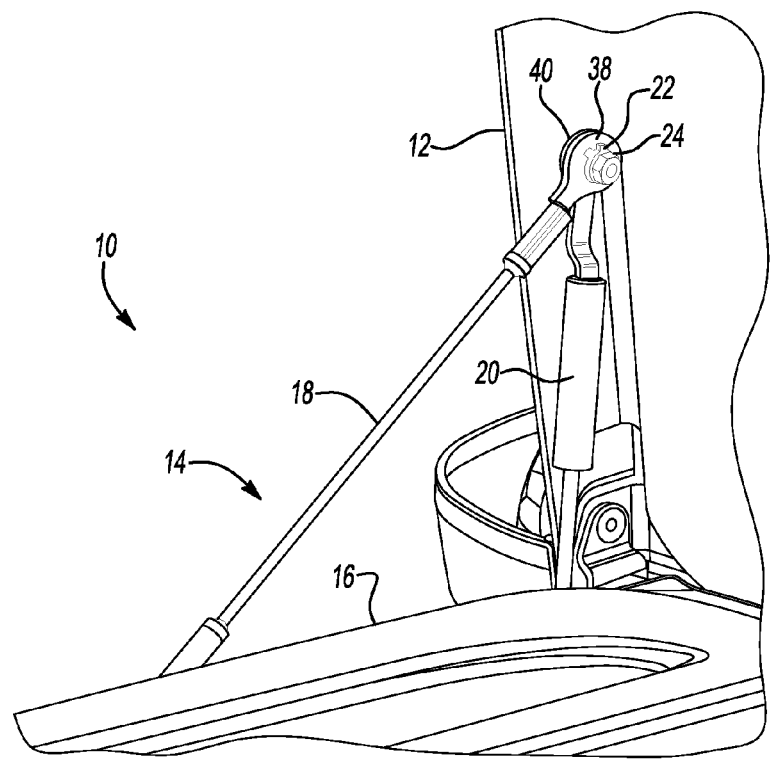
FIG. 1 is a schematic perspective fragmentary illustration of an endgate assembly secured to a vehicle body with a damper end and a cable end retained to a sidewall by a keyed support member.

Referring to the drawings, wherein like reference numbers refer to like components, FIG. 1 shows a vehicle 10 represented by a vehicle body that includes a vehicle sidewall 12. An endgate assembly 14 is secured to the sidewall 12. The endgate assembly 14 includes an endgate 16, a cable 18, a damper 20, a support member 22 (best shown in FIG. 6 and also referred to as a keyed stud), a bolt 24 and a nut 26. The endgate 16, sidewall 12 (and opposing sidewall, not shown), along with vehicle floor 27 define in part a vehicle bed 29, as shown in FIG. 2.

Figure 2:
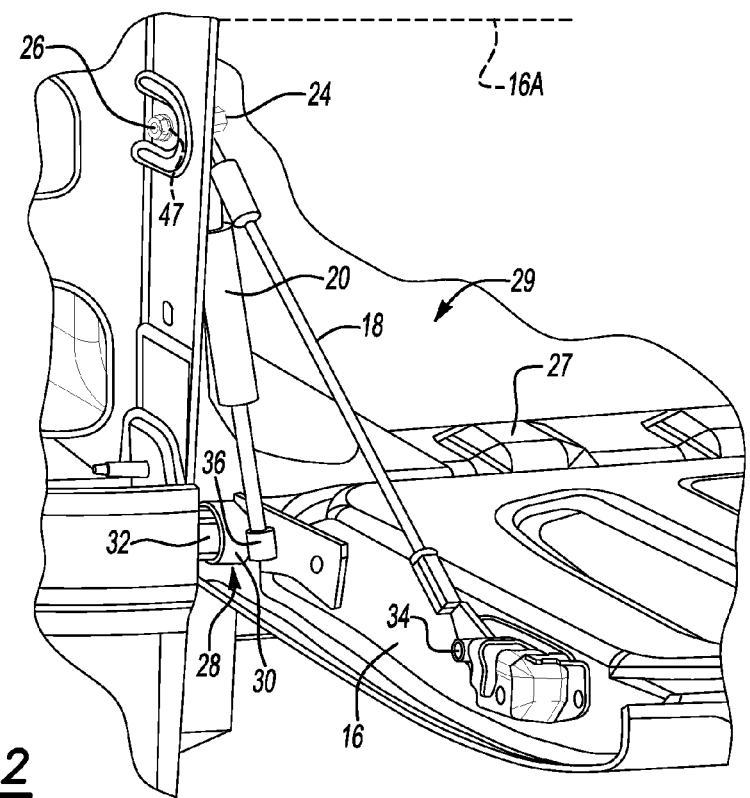
FIG. 2 is a schematic perspective fragmentary illustration of the endgate assembly of FIG. 1, showing a weld nut used with a bolt to secure the support member.

As also shown in FIG. 2, the endgate 16 is supported at a pivot connection 28 at which a sleeve 30 on the endgate 16 fits over a pivot pin 32 extending from the sidewall 12, as is known. The other side of the endgate 16 is similarly supported, but can be lifted vertically off of the sleeve to allow the endgate 16 to move transversely and slide the sleeve 30 off of the pin 32, as is typical. It should be appreciated that, although such a pivot connection is most advantageous, pivot connections that require different steps and or tools to release the endgate from the pivot connection may also be used within the scope of the claimed invention. The endgate 16 pivots at the pivot connection 28 between the open position, shown in FIGS. 1 and 2, and a closed position indicated in phantom as 16A in FIG. 2. The other side of the endgate 16 is not shown but has a substantially identical cable and damper, with a substantially identical support member secured to the opposing sidewall using a substantially identical bolt and nut. Accordingly, for purposes of illustration, only cable 18, damper 20 and support member 22 are shown, with like components arranged in a mirror image on the other side of the endgate 16 and opposite sidewall.

Referring to FIG. 2, a first end 34 of the cable 18 is secured to the endgate 16. Similarly, a first end 36 of the damper 20 is secured to the endgate 16. The first ends 34, 36 remain secured to the endgate 16 when the endgate 16 is removed from the vehicle body 12.

Figure 6:
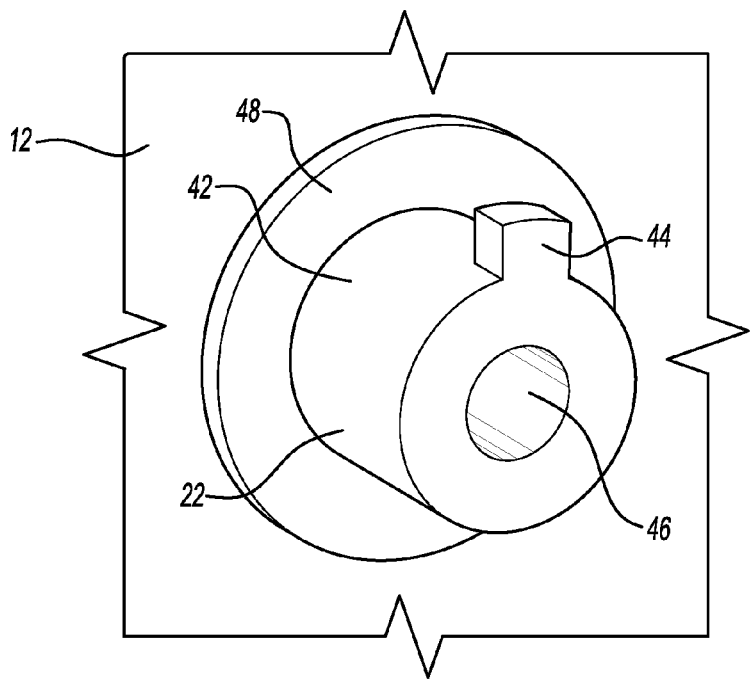
FIG. 6 is a schematic perspective fragmentary illustration of the support member.
Figure 7:
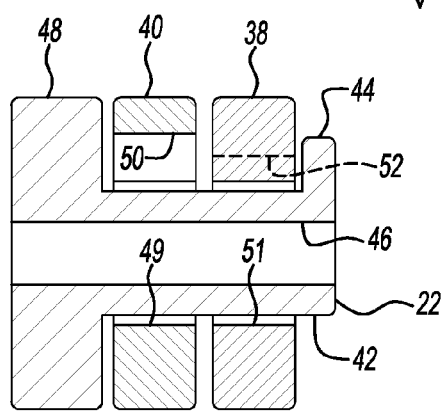
FIG. 7 is a schematic cross-sectional illustration of the support member with cable end and damper end secured thereon, taken at the lines 7-7 in FIG. 4.
Figure 8:
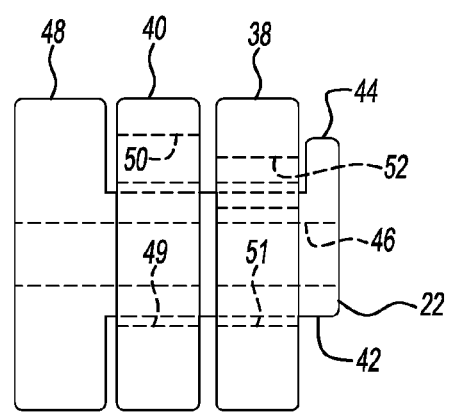
FIG. 8 is a schematic side view of the support member with cable end and damper end of FIG. 7.

Referring again to FIG. 1, the cable 18 has a second end 38 and the damper 20 has a second end 40, both of which are secured to and retained by the support member 22 when the endgate 16 is secured to the vehicle body 12. Referring now to FIG. 6, the support member 22 has a generally cylindrical shank 42 with a protruding key feature 44 extending radially therefrom. A passage 46 extends through the support member 22, as indicated in FIGS. 7-10. The bolt 24 extends through the passage 46 and through an opening 47 (indicated in FIG. 2) in the sidewall 12 to secure the support member 22 to the sidewall 12 with a nut 26 (indicated in FIG. 2 as a weld nut) retaining the bolt 24 at the opposing side of the side wall 12. Other options for the nut 26 within the scope of the claimed invention include a loose nut, a clinch nut, an extruded/threaded hole, or any other appropriate interface for the bolt. A taillight fixture installed adjacent the bolt 24 is removed for clarity in FIGS. 1-3.

Referring to FIGS. 7-10, the support member 22 includes a flange 48 extending from the shank 42. The flange 48 abuts the sidewall 12 when the support member 22 is secured with the bolt 24 and nut 26 to help stabilize the support member 22. When the support member 22 is initially installed on the vehicle 10, the endgate 16 is first connected at the pivot connection 28, and the damper 20 is extended upward, as in FIG. 1. The support member 22 is then adjusted rotationally (i.e., by turning clockwise or counterclockwise) to ensure that the key feature 44 aligns with a keyhole feature 50 in the second damper end 40 before tightening the bolt 24 to set the position of the key feature 44. The second damper end 40 is then slid onto the shank 42 past the key feature 44, as illustrated in FIGS. 7-10, with an annular opening 49 of the second damper end 40 sized to slide onto the shank 42. A spacer wrench can be temporarily held on the shank 42 between the flange 48 and the second damper end 40 to help maintain the rotational position of the shank 42 and the second damper end 40 while tightening the bolt 24. It should be appreciated that, although the shank 42 is generally cylindrical, and the openings 49, 51 are generally annular, different complementary geometries may be used. Additionally, different matable shapes for the key feature 44 and the keyhole 50, 52 may be used.

Figure 9:
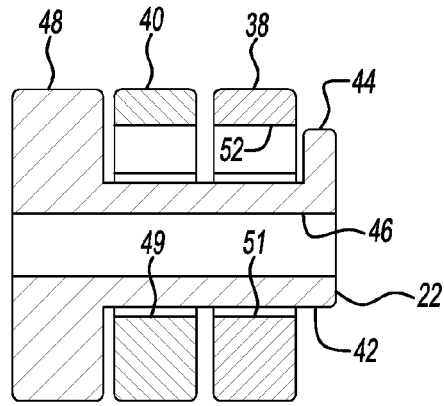
FIG. 9 is a schematic cross-sectional view of the support member with cable end and damper end ready for release therefrom, taken at the lines 9-9 in FIG. 5.
Figure 10:
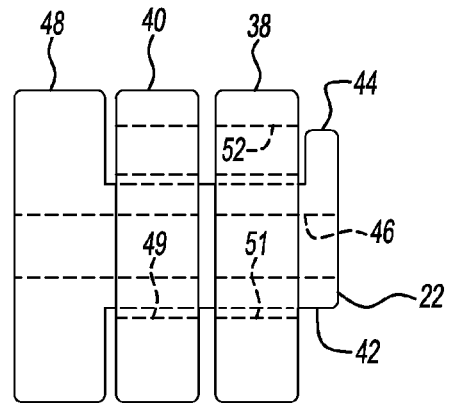
FIG. 10 is a schematic side view of the support member with cable end and damper end of FIG. 9.

Next, the second cable end 38 is slid onto the shank 42, with an annular opening 51 of the second cable end 38 sized to slide onto the shank 42, and with a keyhole feature 52 in the second cable end 38 aligned with the key feature 44, as illustrated in FIGS. 5, 9 and 10. This requires slightly lifting the endgate 16 to an intermediate position in which the endgate is indicated as 16B shown in FIG. 3, and temporarily holding the endgate in position 16B in order to allow enough slack in the cable 18 to allow second cable end 38 to be turned slightly clockwise as in FIG. 3 to align the keyhole feature 52 with the key feature 44.

When the endgate 16 is in the open position of FIGS. 1 and 2, with the cable 18 taut, the second cable end 38 is pulled by the weight of the endgate 16 to rotate slightly counterclockwise, moving the keyhole feature 52 of the second cable end 38 out of alignment with the key feature 44, as best shown in FIGS. 1, 4, 7 and 8. Alternatively, the second cable end 38 can be manually turned out of alignment with the key feature 44. This serves to secure the second cable end 38 to the support member 22. The second damper end 40 is also secured to the support member 22, as the second cable end 38 prevents damper end 40 from passing over the key feature 44. In the positions shown in FIG. 4, the cable 18 and damper 20 are locked to the support member 22 by interference of the second cable end 38 with the key feature 44. The second cable end 38 remains in the locked position shown in FIG. 4 during regular use of the endgate 16 (i.e., pivoting between the open position of FIG. 1 and the closed position 16A), until intentionally manually rotated back to the position of FIG. 5 to allow removal of the endgate 16, as described below. That is, the second cable end 38 does not rotate with respect to the shank 42 during normal opening and closing of the tailgate 16.

Temporary removal of the endgate assembly 14 is accomplished quickly and easily, without tools. Removal of the endgate assembly 14 "modifies" the vehicle bed 29 by permitting easier access to the bed 29. First, the endgate is held in the intermediate position 16B of FIG. 3. This produces the slack in cable 18 required for the next step, turning the second cable end 38 to align the keyhole feature 52 with key feature 44. With the second cable end 38 thus "unlocked", the second cable end 38 and the second damper end 40 are slid off of the support member 22 (i.e., manually pulled inward toward the bed 29), to release the damper 20 and cable from the support member 22. The like damper and cable on the other side of the endgate are released from the like support member on the opposite sidewall in the same manner. The endgate 16 may then be removed from the pivot connection 28 by lifting the opposite side of the endgate 16 slightly upward and sliding the endgate transversely away from sidewall 12 to allow the sleeve 30 to slide off of the pivot pin 32. The endgate assembly 14 is thus completely detached from the vehicle 10 without tools. The detachment process may be accomplished by just one person, without tools, and the endgate can be held in the intermediate position 16B with one hand or leaned against the body, leaving the other hand or hands free to detach the cable end 38 and the damped end 40.

Reattachment of the endgate assembly 14 simply requires reversing the steps for detachment. That is, the endgate 16 is placed at the pivot connection 28 and the sleeve 30 is slid over the pivot pin 32. The endgate 16 is then placed in the open position of FIG. 1, and the second damper end 40 of the damper 20 slides onto the shank 42, with the keyhole feature 50 being aligned with the key feature 44 due to the careful initial installation and tightening of the bolt 24 to ensure such alignment. The endgate 16 is then pivoted to the intermediate position 16B, creating slack in the cable 18 to allow the keyhole feature 52 of the second damper end 38 to be aligned with key feature 44, and slid onto the shank 42 of the support member 22 past the key feature 44. The endgate 16 is then lowered to the open position, with the taut cable 18 automatically turning or rotating the second cable end 38 with respect to the shank 42 so that the keyhole feature 52 is out of alignment with the key feature 44. Alternatively, the second cable end 38 can be manually turned with respect to the shank 42 to place the keyhole feature 52 out of alignment with the key feature 44, thereby locking both the second damper end 40 and the second cable end 38 to the support member 22. The damper and cable on the opposite side of the endgate are similarly secured to the support member on the opposing sidewall. Accordingly, no tools are required for reattachment, and the reattachment process may be accomplished by just one person.

While the best modes for carrying out the invention have been described in detail, those familiar with the art to which this invention relates will recognize various alternative designs and embodiments for practicing the invention within the scope of the appended claims.

The invention claimed is:

1. An endgate assembly connectable to a vehicle body for opening and closing a vehicle bed formed by the body, comprising:

an endgate supportable by the vehicle body at a pivot connection and openable and closable by pivoting about the pivot connection between an open position and a closed position;

a keyed support member securable to the vehicle body and having a shank with a protruding key feature;

a damper connected to the endgate and having a damper end with a first keyhole feature; wherein the damper end is configured to slide over the shank when the first keyhole feature is aligned with the protruding key feature;

a cable connected to the endgate and having a cable end with a second keyhole feature; wherein the cable end is configured to slide over the shank when the endgate is held in a position between the open position and the closed position and the second keyhole feature is aligned with the protruding key feature, and to move out of alignment with the protruding key feature when the cable end is rotated relative to the shank; wherein the cable end is between the damper end and the protruding key feature and the cable is configured so that the second keyhole feature remains out of alignment with the protruding key feature once the cable end is so rotated to thereby retain the damper and the cable to the shank when the endgate is in the open position, in the closed position, and is pivoted between the open and closed positions;

wherein the damper end and the cable end are configured to be removed from the keyed support member when the cable end is rotated relative to the keyed support member to align the second keyhole feature with the protruding key feature while the endgate is held in the position between the open position and the closed position, and when the damper end is aligned with the protruding key feature.

2. The endgate assembly of claim 1, wherein the damper end and the cable end are retained by and removed from the keyed support member without tools; and wherein the endgate is removable from the pivot connection without tools when the damper and cable are removed from the keyed support member.

3. The endgate assembly of claim 1, wherein the shank is generally cylindrical and the key feature protrudes radially from the shank; wherein the damper end and the cable end have generally annular openings with the respective keyhole features extending radially from the respective annular openings.

4. The endgate assembly of claim 1 in combination with the vehicle body, wherein the support member has a passage extending therethrough; and further comprising:

a weld nut on an opposite side of an opening in the vehicle body than the support member; and a bolt extending through the passage, the opening in the vehicle body and the nut to secure the support member to the vehicle body.

5. A vehicle comprising:

a vehicle body having a sidewall;

an endgate pivotably supported by the vehicle body and pivotable with respect to the vehicle sidewall between an open and a closed position to open and close, respectively, a vehicle bed formed in part by the endgate and sidewall;

a stud secured to the sidewall and having a protruding key feature;

a damper having a first damper end secured to the endgate and a second damper end with a damper keyhole feature; wherein the second damper end is configured to slide onto the stud past the key feature when the damper keyhole feature is aligned with the key feature; and a cable having a first cable end secured to the endgate and a second cable end with a cable keyhole feature; wherein the second cable end is configured to slide onto the stud past the key feature when the cable keyhole feature is aligned with the key feature, with the second cable end between the key feature and the damper second end, and to be rotated out of alignment with the key feature once the second cable end is on the stud;

wherein the second cable end is configured so that the cable keyhole feature remains out of alignment with the key feature when the endgate is in the open position, in the closed position, and when the endgate pivots between the open and closed position, the damper and cable thereby being secured to the stud by interference between the second cable end and the protruding key feature, and being releasable from the stud by rotating the second cable end to align the cable keyhole feature with the protruding key feature and aligning the damper keyhole feature with the protruding key feature.

6. The vehicle of claim 5, wherein the damper and the cable are releasable from the stud without tools by alignment of the keyhole features and the protruding key feature.

7. The vehicle of claim 5, wherein the stud has a generally cylindrical shank and the key feature protrudes radially from the shank; wherein the damper end and the cable end have generally annular openings with the respective keyhole features extending radially from the respective annular openings.

8. The vehicle of claim 5, wherein the stud has a passage extending therethrough; and further comprising:
  a weld nut on an opposite side of an opening in the vehicle body than the stud; and
  a bolt extending through the passage, the opening in the vehicle body and the nut to secure the stud to the vehicle body.

9. A method of modifying a vehicle bed on a vehicle wherein the endgate is connected to the vehicle via a cable and a damper, comprising:
  holding the endgate between an open position and a closed position;
  while holding the endgate, turning a cable end on the cable connecting the endgate to a vehicle sidewall until a keyhole feature in the cable end aligns with a key feature in a support member supporting the cable;
  after turning the cable end and while still holding the endgate, sliding the cable end off of the support member to release the cable end from the sidewall; and
  after sliding the cable end, sliding a damper end off of the support member when a keyhole feature of the damper end is aligned with the key feature of the support member to release the damper from the support member.

10. The method of claim 9, wherein opposing ends of the cable and damper are secured to the endgate, and further comprising:
  lifting the endgate from the vehicle body at a pivot connection at which the endgate pivots to thereby remove the endgate, the released damper and the released cable from the vehicle.

11. The method of claim 10, further comprising:
  reattaching the endgate to the vehicle by
    placing the endgate at the pivot connection,
    aligning the keyhole feature of the damper end with the key feature and sliding the damper end onto the support member past the key feature;
    pivoting the endgate to a position between the open and the closed positions;
    aligning the keyhole feature of the cable end with the key feature and sliding the cable end onto the support member past the key feature; and
  turning the cable end so that the keyhole feature of the cable end is out of alignment with the key feature, thereby securing the cable and the damper to the vehicle.

* * * * *